(12) United States Patent
Xinghua

(10) Patent No.: US 11,885,602 B2
(45) Date of Patent: Jan. 30, 2024

(54) COMBINATION FIREWORKS AND MANUFACTURING METHOD THEREOF

(71) Applicant: Li Xinghua, Hunan (CN)

(72) Inventor: Li Xinghua, Hunan (CN)

( * ) Notice: Subject to any disclaimer, the term of this patent is extended or adjusted under 35 U.S.C. 154(b) by 85 days.

(21) Appl. No.: 17/164,833

(22) Filed: Feb. 1, 2021

(65) Prior Publication Data

US 2021/0372746 A1     Dec. 2, 2021

(30) Foreign Application Priority Data

May 26, 2020   (CN) .......................... 202010452744.2
Sep. 2, 2020    (CN) .......................... 202010909465.4

(51) Int. Cl.
  *F42B 4/20*   (2006.01)
  *F42B 4/30*   (2006.01)
  *F42B 4/26*   (2006.01)

(52) U.S. Cl.
  CPC ............... *F42B 4/20* (2013.01); *F42B 4/30* (2013.01); *F42B 4/26* (2013.01)

(58) Field of Classification Search
  CPC ...... F42B 4/00; F42B 4/02; F42B 4/20; F42B 4/26; F42B 4/30
  USPC ................................. 102/335, 343, 349, 358
  See application file for complete search history.

(56) References Cited

U.S. PATENT DOCUMENTS

| 4,771,695 A * | 9/1988 | Simpson | F42B 4/20 |
| | | | 102/361 |
| 7,011,220 B2 * | 3/2006 | Deye | F42B 4/20 |
| | | | 211/60.1 |
| 7,086,530 B2 * | 8/2006 | Price | F42B 4/26 |
| | | | 248/346.03 |
| 7,681,502 B2 * | 3/2010 | Huang | F42B 4/14 |
| | | | 102/358 |

(Continued)

FOREIGN PATENT DOCUMENTS

| CN | 102213569 A | 10/2011 |
| CN | 102538597 B | 12/2013 |

(Continued)

OTHER PUBLICATIONS

Search Report in CN 202010909465; dated Mar. 1, 2022 (Year: 2022).*

(Continued)

*Primary Examiner* — James S Bergin
(74) *Attorney, Agent, or Firm* — Tatonetti IP

(57) ABSTRACT

Disclosed is a kind of combination fireworks, in which a plurality of paper tubes form a tube row, and the plurality of tube rows are stacked and assembled for forming, wherein each tube row is provided with a bottom cardboard, two sides of the bottom cardboard are correspondingly provided with notch positioning holes, and the bottom cardboard beside the notch positioning holes forms the protruding cardboard beside the holes; the cardboard beside the holes is folded and stuck on both sides of the paper tube, and both ends of the paper tube are respectively embedded in corre- (Continued)

sponding notch positioning holes. The structure of spaced tube rows is adopted, so that the radial size error of the tube body of the paper tube is not accumulated in the tube rows, thus allowing the tube body to accurately reach a predetermined work position, and improving the accuracy and reliability of subsequent processes.

10 Claims, 17 Drawing Sheets

(56) References Cited

U.S. PATENT DOCUMENTS

| | | | |
|---|---|---|---|
| 9,568,289 B2 * | 2/2017 | Macchia | F42B 4/20 |
| 11,402,182 B2 * | 8/2022 | Ingram | F42B 4/20 |
| 2008/0006168 A1 * | 1/2008 | Huang | F42B 4/20 |
| | | | 102/358 |

FOREIGN PATENT DOCUMENTS

| | | | | |
|---|---|---|---|---|
| CN | 103528446 A | | 1/2014 | |
| CN | 103307932 B | | 6/2015 | |
| CN | 104913691 A | | 9/2015 | |
| CN | 206900975 U | * | 1/2018 | ............ B65D 61/00 |
| CN | 106275650 B | | 10/2018 | |
| CN | 109029141 A | * | 12/2018 | ............... F42B 4/00 |
| DE | 9315637 U1 | * | 3/1994 | ............... F42B 4/20 |
| EP | 2889571 A1 | * | 7/2015 | ............. F42B 39/00 |
| FR | 2803910 A1 | * | 7/2001 | ............... F42B 4/00 |

OTHER PUBLICATIONS

CN-206900975-U; Machine translation (Year: 2018).*
CN-109029141-A; Machine translation (Year: 2018).*
Machine translation of EP-2889571-A1 (Year: 2015).*
Machine translation of FR-2803910-A1 (Year: 2001).*

* cited by examiner

COMBINATION FIREWORKS AND MANUFACTURING METHOD THEREOF

CROSS-REFERENCES TO RELATED APPLICATIONS

This Non-Provisional Utility patent application claims the benefit of and priority to Chinese Patent Application Serial No. 202010909465.4, filed Sep. 2, 2020, entitled "A kind of combination fireworks and manufacture method thereof," the entire contents of which is hereby incorporated herein by reference. This Non-Provisional Utility patent application claims the benefit of and priority to Chinese Patent Application Serial No. 202010452744.2, filed May 26, 2020, entitled "A kind of combination fireworks," the entire contents of which is hereby incorporated herein by reference.

TECHNICAL FIELD

The invention relates to a kind of combination fireworks. The invention especially relates to products composed the same kind or different kinds of ground fireworks, fountains, bead-spitting fireworks and other products.

BACKGROUND

Combination fireworks usually consist of several paper tubes connected into a single row of paper tubes (hereinafter referred to as tube rows); then, the drilling and inserting process is completed on the tube row, i.e. the flash hole is processed on each paper tube by the pin punch, and then the lead wire is inserted into the flash hole, so that the paper tubes are connected in series through the lead wire to form a fire transmission relationship; several rows of tubes are assembled and molded in layers (also known as pots). The molded body of the pots is a rectangular block shown in FIG. 1. The inner cavity device of the paper tube launches gunpowder and effect parts, which are ignited by lead wire.

The traditional manual pot assembly has low working efficiency, high labor intensity, large number of employees and high production cost. Therefore, the industry has developed automatic pot assembly equipment, and the mechanized production equipment for combination fireworks is commonly called "pot assembly machine" or "fireworks assembly machine" in the industry. Relevant patent documents in the prior art, such as "a fireworks numerical control assembly machine" disclosed in CN202158808U; "a punching insertion system for fireworks assembly" disclosed in CN102213569A; "a fireworks assembly machine" disclosed in CN102538597B; "a foam strip placement device and automatic fireworks assembly machine" disclosed in CN106275650B; and "a method and system for assembling fireworks cartridges" disclosed in CN103307932B, after years of development, the pot assembling equipment is now a relatively mature fireworks machine that has been applied on a large scale. However, in various existing devices, the blanking molding of the tube rows is the same as or similar to that disclosed in the above-cited patent documents. Since there are a large number of relevant patent documents, they will not be listed one by one.

As shown in FIG. 1, each tube row is a non-spaced tube row in which the tube bodies of the paper tubes are in close contact, and the tube bodies of each paper tube constituting the tube row can only be closely arranged, and there should be no spacing between the two paper tubes. However, because the thickness of the wall of the rolled paper tube is different; the overlapping part of the rolled tube is bulged, resulting in that the tube is not round; therefore, the radial size of the tube will inevitably have errors with the standard size of the tube. Since there is no distance between the tubes, there is no space to adjust the positions of each tube, so that this error accumulates in the tube row, resulting in large deviation between the actual positions of some tubes and the work positions predetermined by the equipment according to the standard size of the tube; as the paper tube cannot accurately reach the predetermined station, the accuracy and reliability of the subsequent processes such as punching and inserting, paper bar (round cardboard) pressing are reduced.

However, in the process of processing the tube rows of so many existing pot assembly machines, before the cylinder rows are glued and fixed, the following work must be completed by relying on the close contact and interaction of each tube body: first, make sure the arrangement of the tube rows is not disorderly; second, push the tube row to move to complete streamlined production. Therefore, the existing pot assembling machine cannot process the tube rows with spacing between the paper tubes (referred to tube rows with spacing herein).

In the invention, the tube row comprises the following states before being glued and fixed: the tube row is not fixed with adhesive tape, double-sided adhesive tape or the like; or there is no glue applied to the tube row; or the tube row has been applied with glue but the glue has not yet cured, etc.

In addition, the above equipment also cannot process fan-shaped combination fireworks.

However, according to U.S. Standards, paper tubes with a charge of 200-500 g for combination fireworks products must have a spacing of more than half an inch. Fan-shaped products have strong ornamental value, but manual production speed is slow. Every year, a large number of orders cannot be completed on time, and factories can only receive orders according to production capacity.

"An automatic arrangement device for combination fireworks" disclosed in CN 103528446A can meet the requirements of arranging tubes with spacing and process combination fireworks with fan-shaped bodies. However, the efficiency of blanking and arranging tubes is relatively low, and the transportation of tubes requires the cooperation of special transfer devices—for example, "a transfer device for combination fireworks tube row" disclosed in CN104913691A, whose production efficiency cannot meet the needs of large-scale production. At the same time, the problem that the tube row is prone to disorder before entering the transfer device and after exiting the transfer device has not been solved.

Therefore, in actual production, when it is necessary to process the combination fireworks products composed of spaced tubes, only the traditional manual method can be adopted. As shown in FIG. 2, the manual production process of rectangular block (paper tube vertical type) combination fireworks is shown. FIG. 3 shows the manual production process of fan-shaped combination fireworks. First, the bottom cardboard 2 is manually brushed with glue, and the paper tubes 1 are manually arranged one by one until the row is full. Because the cylindrical paper tube body is easy to roll, especially after being arranged into spaced tube rows, there is no contact and lack of interaction between the paper tube bodies, and the tube body is easy to change its position during the movement process before the glue is cured; therefore, it must be placed on the workbench to wait for the glue to solidify until the paper tube 1 will not shift. It takes about two hours in summer and about four hours in winter. Generally, it is arranged in the morning and then inserted and stacked in the afternoon. Then the pots are assembled, such as the rectangular body shown in FIG. 2 and the fan-shaped body shown in FIG. 3. For this kind of products, the problems of low work efficiency, high labor intensity, large number of employees and high production cost have not been solved. At the same time, because it is manual operation, there may be deviation in the position of each cylinder, which affect the fireworks display effect, especially the fan-shaped body shown in FIG. 3. After being launched to high altitude, this deviation is enlarged, seriously affecting the fireworks display effect.

SUMMARY

In order to solve the above disadvantages, the technical problem to be solved by the invention is to provide a kind of combination fireworks, which can maintain the structural stability of the spaced tube rows before the tube rows are glued and fixed, and is convenient to realize automatic production. In order to solve the above technical problems, the technical scheme adopted by the invention is that combination fireworks, a plurality of paper tubes form a tube row, and the plurality of tube rows are stacked and assembled for forming; it is characterized in that each tube row is provided with a bottom cardboard, two sides of the bottom cardboard are correspondingly provided with notch positioning holes, and the bottom cardboard beside the notch positioning holes forms a protruding cardboard beside the holes; both ends of the paper tube are respectively embedded in corresponding notch positioning holes, and the cardboard beside the holes is folded and stuck on both sides of the paper tube.

The notch positioning hole can be any shape capable of blocking the side wall of the paper tube, such as round hole, square hole and trapezoidal hole. Preferably, the notch positioning hole is a notched circular hole.

In order to make the structure more stable, it is preferred that the notch length of the notched circular hole is not greater than the diameter of the paper tube.

The manufacturing method of the combination fireworks comprises the following steps:

Step 1, arrange the paper tubes according to the set tube spacing; punch notch positioning holes on both sides of the bottom cardboard, wherein the hole spacing of the notch positioning holes is arranged corresponding to the tube spacing, and the bottom cardboard beside the notch positioning holes forms protruding cardboard beside the holes;

Step 2, stack the arranged paper tubes and the bottom cardboard correspondingly, and set the notch positioning holes corresponding to the paper tubes;

Step 3, press the cardboard beside the hole to be stuck between two paper tubes in a folded state to obtain a tube row;

Step 4, stack and assemble a plurality of tube rows for forming.

In the above method, the bottom cardboard can be covered and stacked on the paper tubes arranged, and the cardboard beside the pressing hole is pressed down to make it fold downward; the bottom cardboard can also be stacked under the arranged paper tubes, and the cardboard beside the upper pressing hole is folded upward.

Preferably, the method also comprises applying glue to the paper tube and/or the bottom cardboard. The application of glue may be carried out during the conveying of the paper tube and/or the bottom cardboard.

The both sides of the bottom cardboard are correspondingly provided with notch positioning holes, and the distance between the notch positioning holes located on the same side of the bottom cardboard is called the hole spacing of the notch positioning holes. Preferably, the hole spacing of the corresponding notch positioning holes on both sides of the bottom cardboard is the same. The vertical tube row of rectangular combination fireworks is made. Preferably, the hole spacing of the corresponding notch positioning holes on both sides of the bottom paperboard is different, and the hole spacing of the notch positioning holes near the top end (emitting end) of the paper tube is larger. What is made is a fan-shaped tube row of fan-shaped combination fireworks.

In the fan-shaped tube row, in order to make the distribution of the corresponding notch positioning holes on both sides of the bottom paperboard more consistent with the fan-shaped distribution of the tube body, the two ends of the tube body are just stuck in the two corresponding notch positioning holes, and the paperboard beside the holes is not twisted, so as to effectively improve the positioning structural strength. Preferably, the bottom paperboard consists of a central straight section and the oblique sections at both sides.

The invention has the beneficial effects that the structure of spaced tube rows is adopted, so that the radial size error of the tube body of the paper tube is not accumulated in the tube rows, thus allowing the tube body to accurately reach a predetermined work position, and significantly improving the accuracy and reliability of subsequent processes such as drilling, inserting and guiding, pressing of paper bars (round paperboard) and the like; at that same time, the structure of the tube row with spacing can be kept stable before the tube row is glued and fixed; the structure is simple, the processing is easy, and it is easy to realize automatic production.

In order to make the above objects, features and advantages of the present invention more apparent and understandable, the following detailed description of specific embodiments of the present invention will be taken in conjunction with the accompanying drawings. Many specific details are set forth in the following description to facilitate a full understanding of the invention. However, the invention can be practiced in many other ways different from those described herein, and those skilled in the art can make similar modifications without departing from the connotation of the invention, so the invention is not limited by the specific embodiments disclosed below.

It should be noted that when an element is called "fixed" to another element, it can be directly on the other element or there can also be a centered element. When an element is considered to be "connected" to another element, it may be directly connected to the other element or there may be a centered element at the same time. Unless otherwise defined, all technical and scientific terms used herein have the same meanings as are generally understood by those skilled in the art of the present invention. Terms used herein in the specification of the invention are for the purpose of describing specific embodiments only and are not intended to limit the invention. As used herein, the term "and/or" includes any and all combinations of one or more related listed items.

DETAILED DESCRIPTION

Embodiment 1

FIGS. 4-15 show a specific structure of the present invention. The combination fireworks have a forming device making tube rows spaced. The tube rows processed and produced are fan-shaped, and there are ten paper tubes in each tube row.

Figure 1:
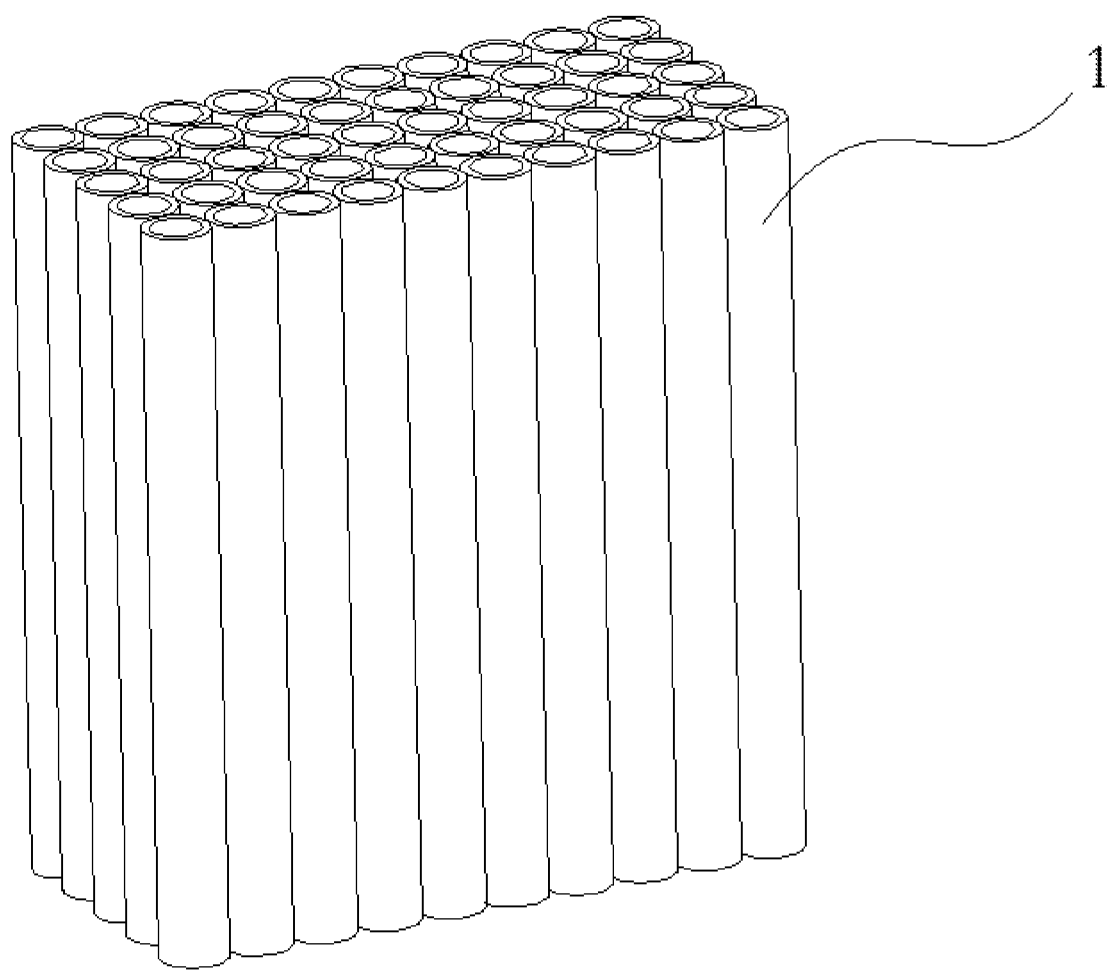
FIG. 1 is a schematic structural diagram of existing rectangular body combination fireworks composed of unspaced tube rows.
Figure 2:
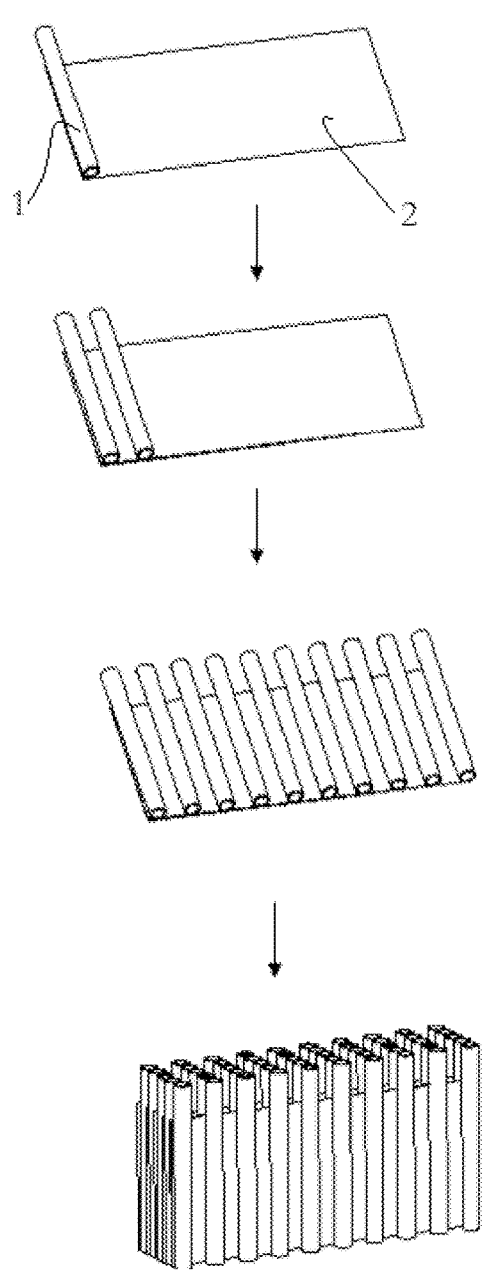
FIG. 2 is a schematic diagram of an existing production process of rectangular body combination fireworks composed of spaced tube rows.
Figure 3:
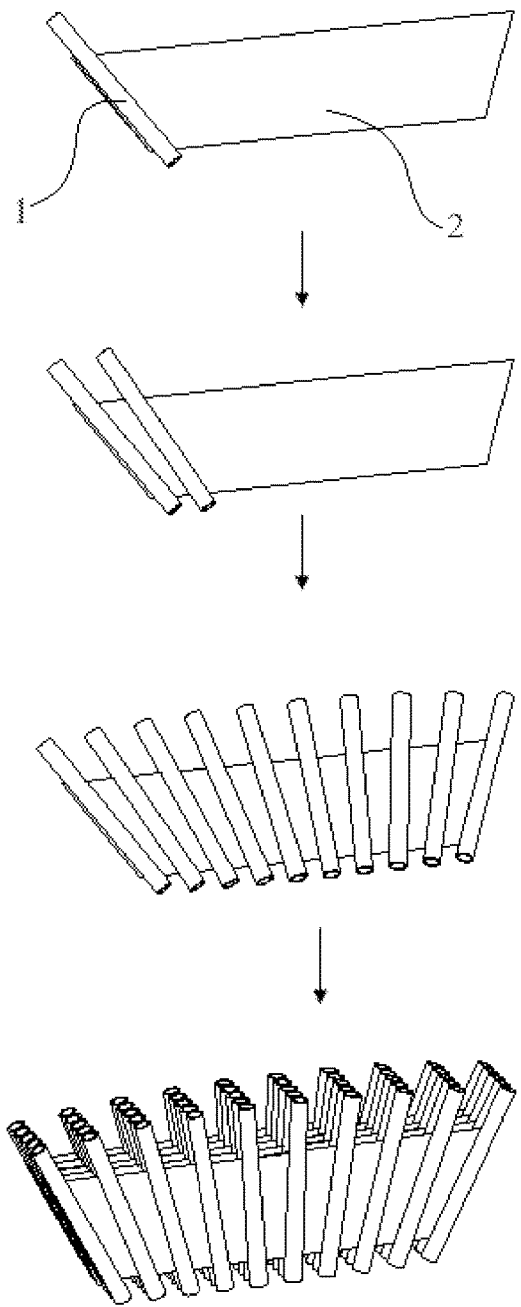
FIG. 3 is a schematic diagram of an existing production process of fan-shaped combination fireworks composed of spaced tube rows.
Figure 4:
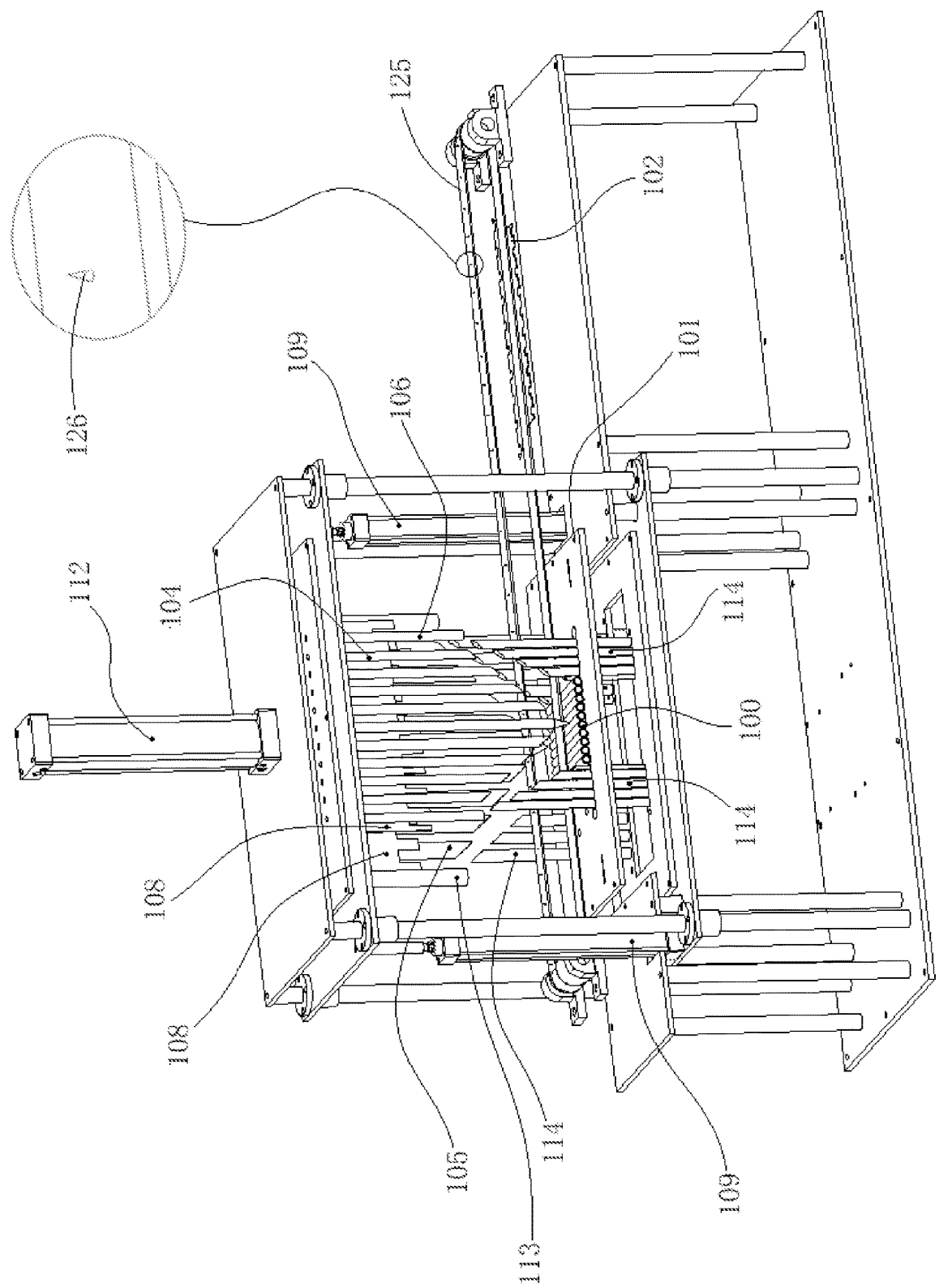
FIG. 4 is a schematic structural diagram of the fan-shaped body combination fireworks automatic production equipment according to Embodiment 1 of the present invention (the number of inserts of the molding device is odd, and the bottom cardboard has not been stacked on the paper tube group)

As shown in FIG. 4, the device comprises a platen 101 on which a cardboard group 100 is placed, which consists of ten paper tubes 1 arranged in parallel without spacing. The blanking of the paper tube 1, arranging the paper tube 1 side by side without spacing to form a paper tube group 100, and feeding the paper tube group 100 to the platen 101 can be completed manually; they can also be completed automatically through the device.

Figure 5:
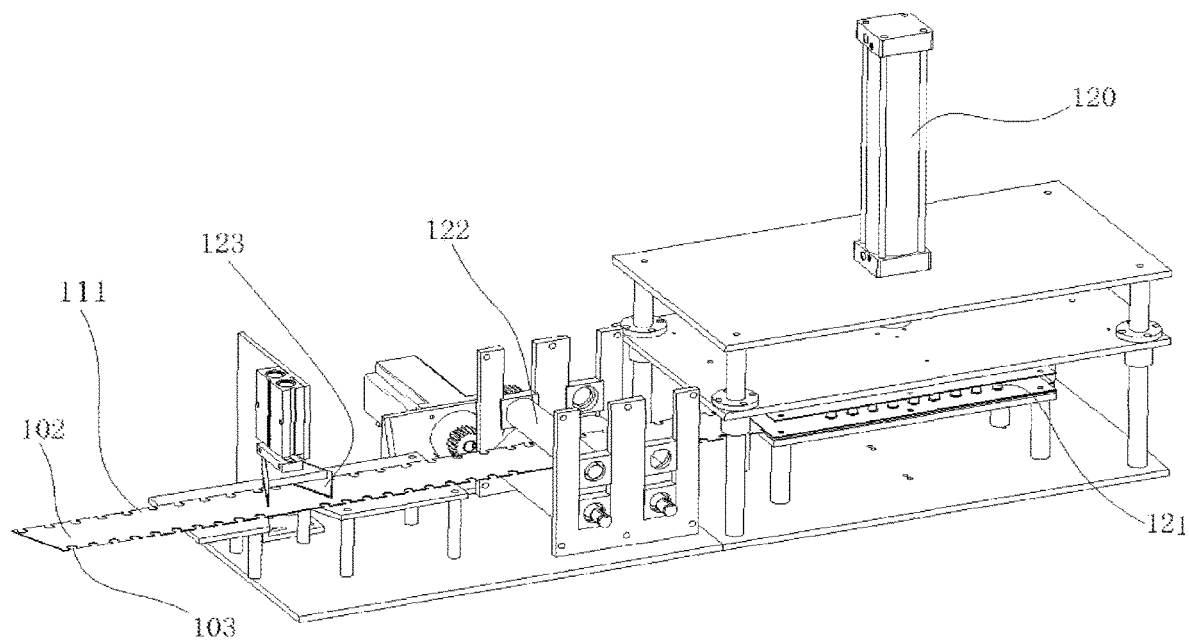
FIG. 5 is a schematic structural diagram of the stamping mechanism.
Figure 6:
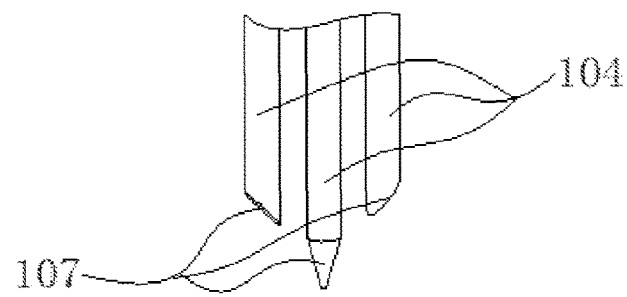
FIG. 6 is a schematic structural diagram of the bottom tip 107 of the first insert 104.
Figure 7:
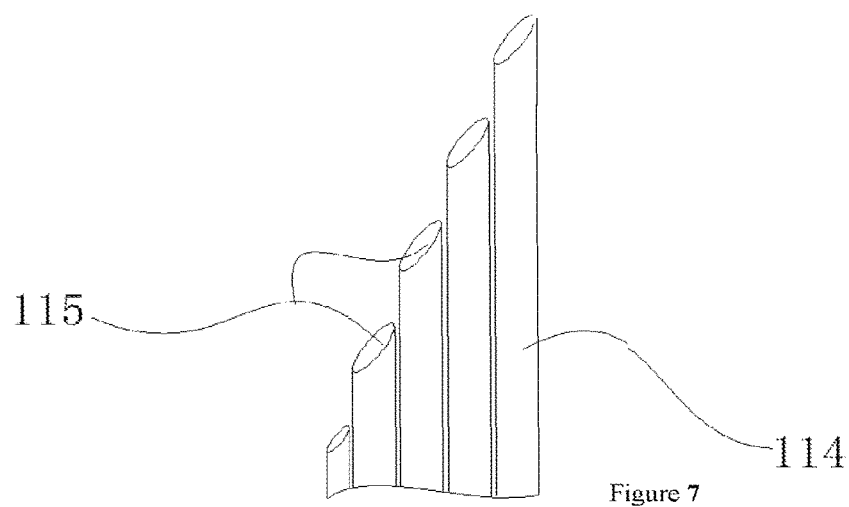
FIG. 7 is a schematic structural diagram of a limit working surface 115 with a ramp surface at the top end of the limit rod 114.

This kind of equipment is generally provided in the existing pot assembling machines, and the specific working flow is as follows: a plurality of paper tubes 1 are blanked to the worktable surface at one time according to the required quantity and arranged in rows without spacing to form a paper tube group 100; then, the paper tube group 100 on the worktable surface is pushed out in rows along the direction parallel to the central axis of the paper tube body by the material pushing device, and is fed to the platen 101 under the clamping of the worktable surface and the conveying roller group. It's like the blanking and discharging system of "a fireworks assembly machine" disclosed in CN102538597B. No more detailed description here The device also includes a stamping mechanism and a paper feeding mechanism, as shown in FIG. 5: the stamping mechanism includes a stamping head 121 driven by a cylinder 120, a clamping paper feeding roller group 122 driving the bottom cardboard 102 forward, and a pneumatic paper cutting knife 123. The stamping mechanism respectively punches out ten notch positioning holes 103 on both sides of the bottom cardboard 102; the notch positioning hole 103 in this example is a notch circular hole, the notch length of which is not greater than the diameter of the paper tube 1 to make the structure more stable.

The hole spacing of the notch positioning hole 103 of the bottom cardboard 102 is set corresponding to the set tube spacing, and the bottom cardboard beside the notch positioning hole 103 constitutes a protruding hole side cardboard 111.

The clamping feed roller set 122 continues to drive the stamped bottom cardboard 102 into the feeding mechanism.

As shown in FIG. 4, the paper feeding mechanism employs a conveyor belt 125, on which is provided a needle body 126 for dragging the bottom cardboard 102. The needle body 126, which moves circumferentially along with the conveyor belt 125, is inserted into the bottom cardboard, thereby conveniently, reliably and accurately conveying the stamped bottom cardboard 102 to a position corresponding to the superimposed position of the paper tube group 100, thereby realizing the conveying of the bottom cardboard 102. It is paused after the bottom cardboard is conveyed in place. When the paper holder presses down the bottom cardboard 102, the bottom cardboard 102 is released from the needle body 126, and then the conveyor belt 125 and its needle body 126 continue to move circumferentially to carry out the conveying of the next bottom cardboard.

A sizing mechanism for applying glue to the underside of the bottom cardboard 102 is provided below the conveyor belt 125.

The two shapers are arranged corresponding to the paper tube group 100 and reciprocate up and down toward the paper tube group 100 under the drive of the shaping cylinder 112. Two shapers are arranged in parallel in the axial direction of the paper tube 1, the first shaper is close to the bottom end of the paper tube 1, and the first shaper consists of eleven (singular) parallel first inserts 104; the second shaper is close to the top end (emitting end) of the paper tube 1, and the second shaper consists of eleven parallel second inserts 105. In this example, the radial dimension of the first insert 104 is smaller than that of the second insert 105. After the thinner insert is inserted between the two paper tubes, the spacing between the tubes formed is smaller; after the thicker insert is inserted between the two paper tubes, the formed spacing between the tubes is larger; the formed tube row is in a fan-shaped distribution state with the bottom end folded and the top end unfolded, so as to meet the production of fan-shaped body combination fireworks.

Apart from the difference in radial dimensions, the structures of the two shapers are similar, and the first shaper is described below as an example: the spacing between the respective first inserts 104 is set to correspond to the diameter of the paper tube 1 so as to reliably position the paper tube 1. The bottom end of the first insert 104 is provided with a tip 107. In this example, the tip 107 of one of the centered first inserts 104 is at the lowest position. From the middle to both sides, the position of the tip 107 of each first insert 104 is gradually raised. The inserts on both sides are asymmetrically distributed, with the central axis of the center inserts as the axis of symmetry, that is, the center line of the first shaper.

In this example, both sides of the two shapers are provided with sheath members: the first shaper is the first sheath rod 106 on both sides thereof; the second shaper is a second sheath rod 113 on both sides thereof.

The device is provided with two paper presses 108 corresponding to the paper tube group 100, and drives the paper presses 108 to reciprocate up and down toward the paper tube group 100. The two paper presses 108 are arranged side-by-side in the axial direction of the paper tube 1. Eleven parallel pressing teeth 110 are provided at the bottom end of the paper press 108. The spacing between the pressing teeth 110 is provided corresponding to the diameter of the paper tube 1, so as to ensure that the cardboard 111 beside the hole is pressed down and folded.

The both sides of the paper tube group 100 are provided with follow-up stoppers. In this example, the four follow-up stoppers are all composed of five limit rods 114 distributed in parallel, and the two limit cylinders 109 drive each limit rod 114 to rise and fall synchronously. The height of the five limit rods 114 is raised from inside to outside in turn, and the top ends of the five limit rods 114 are provided with limit working surfaces 115 with slope surfaces, and the limit working surfaces 115 respectively contact and press the side walls of the paper tubes 1 on both sides of the paper tube group 100.

Figure 8:
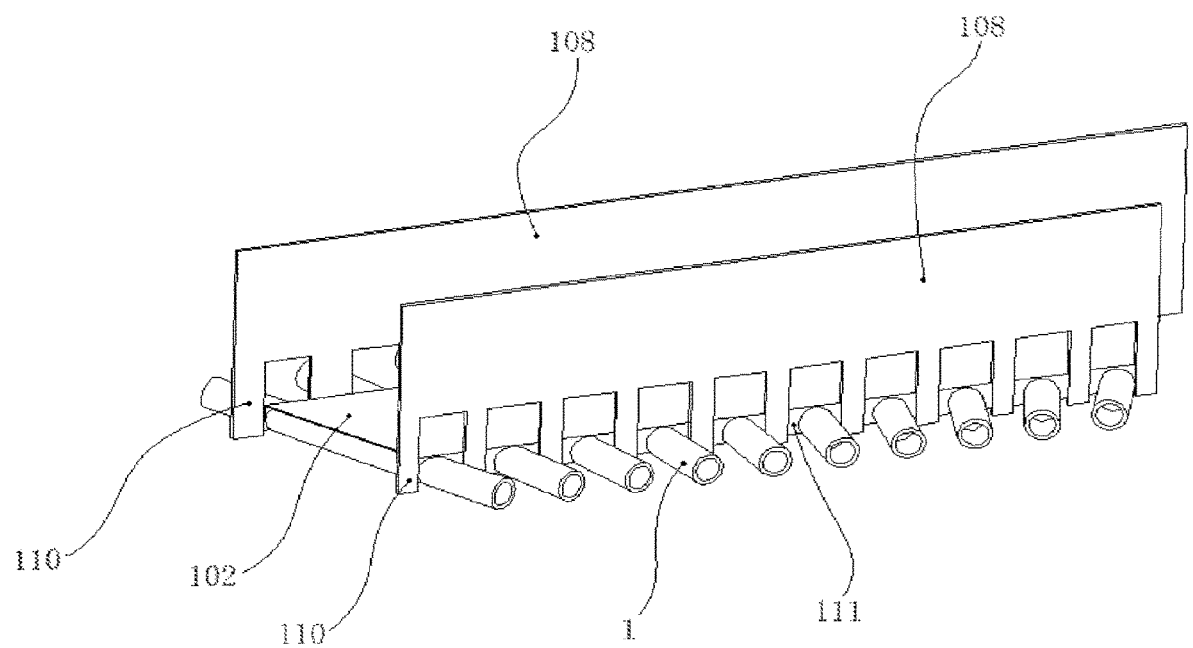
FIG. 8 is a schematic diagram of the working principle of the paper press.
Figure 9:
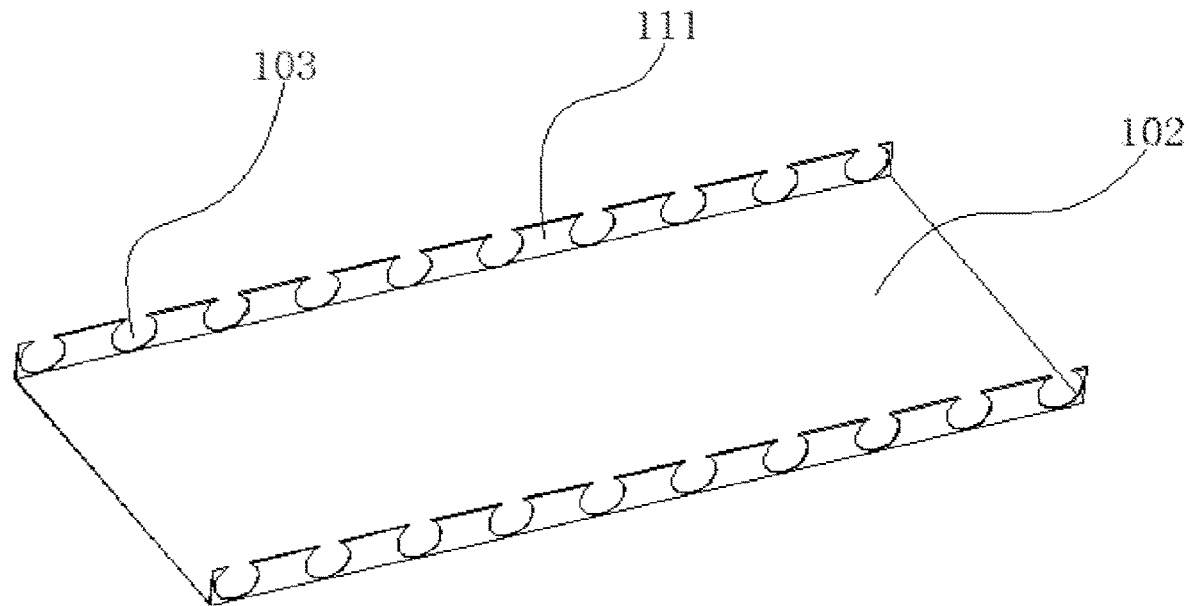
FIG. 9 is a schematic structural diagram of the bottom cardboard 102 being pressed into a folded state.
Figure 10:
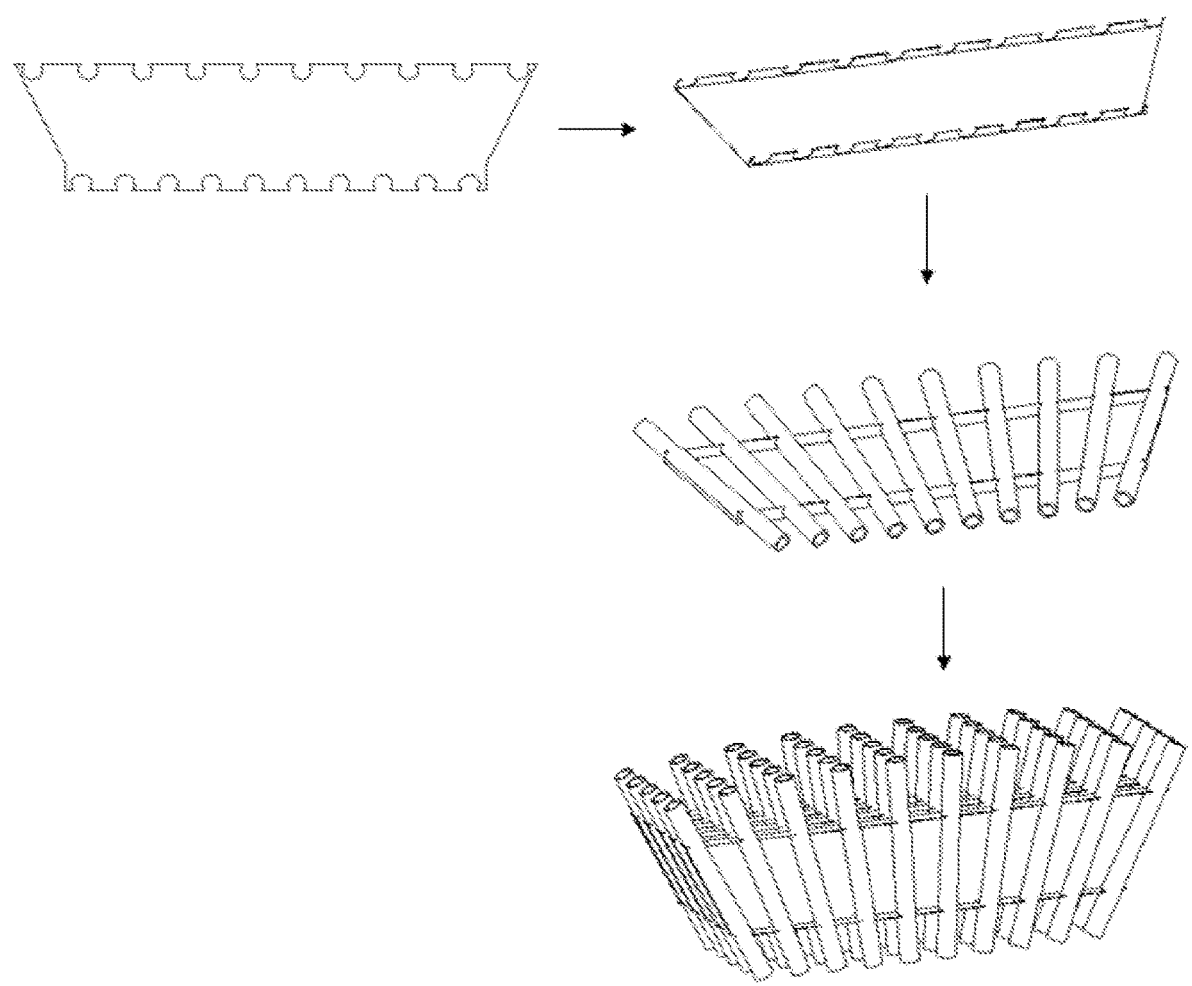
FIG. 10 is a schematic diagram of the production flow of the fan-shaped combination fireworks composed of spaced tube rows according to Embodiment 1 of the present invention.
Figure 11:
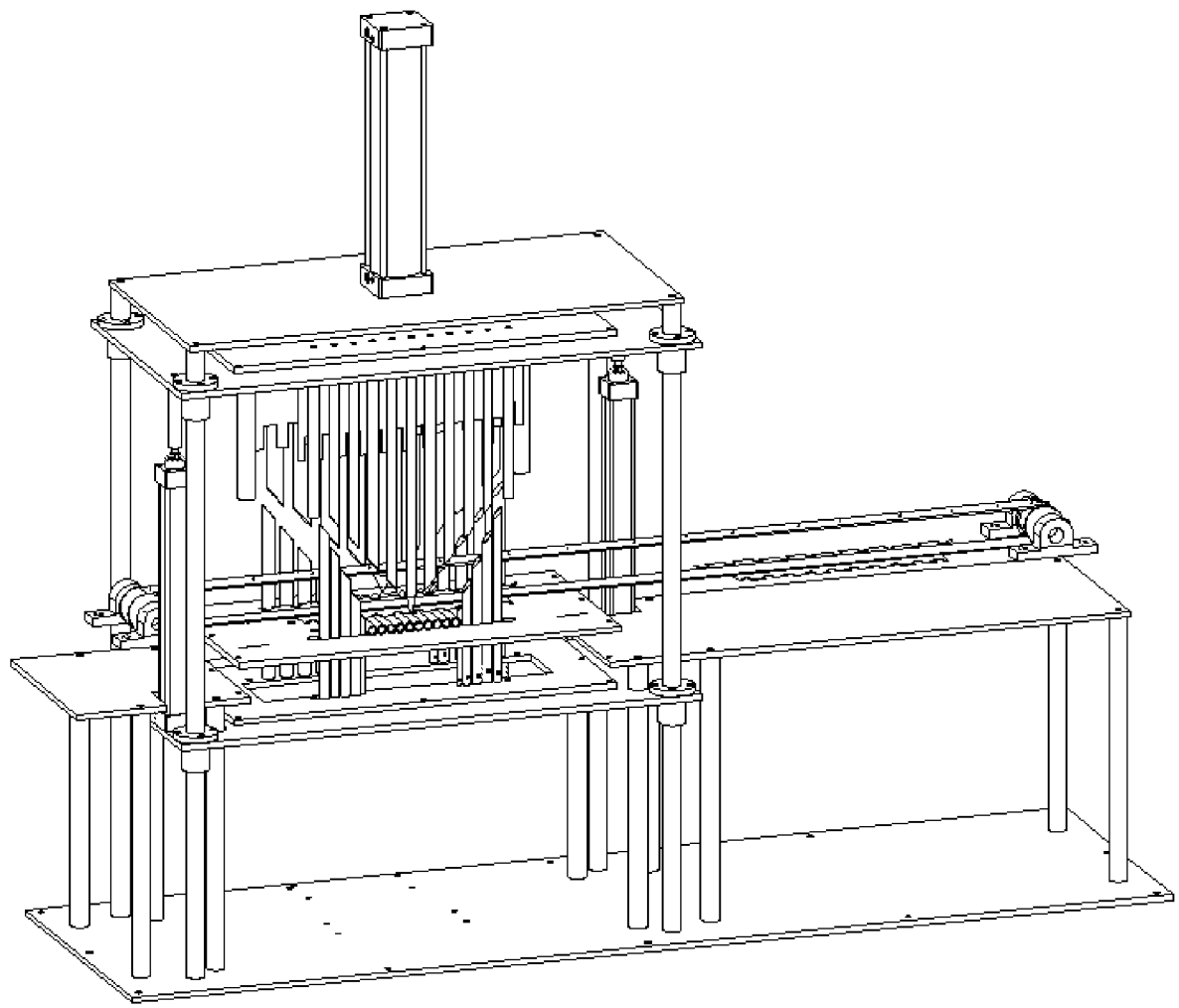
FIG. 11 is a schematic structural diagram of the fan-shaped body combination fireworks automatic production equipment according to Embodiment 1 of the present invention (the bottom cardboard has been stacked on the paper tube group)
Figure 12:
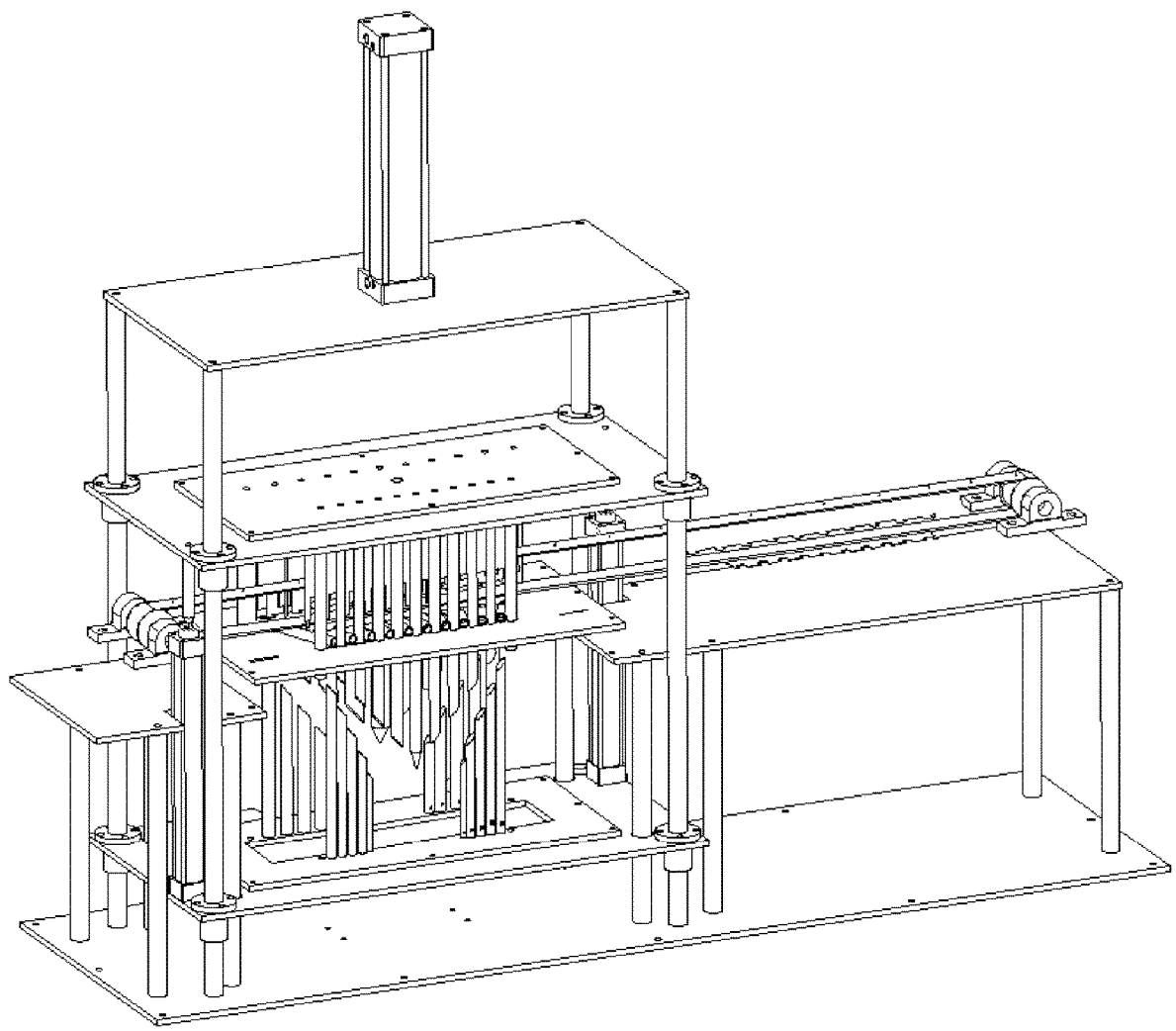
FIG. 12 is a schematic structural diagram of the fan-shaped body combination fireworks automatic production equipment according to Embodiment 1 of the present invention (the shaper is pressed down to complete the molding)
Figure 13:
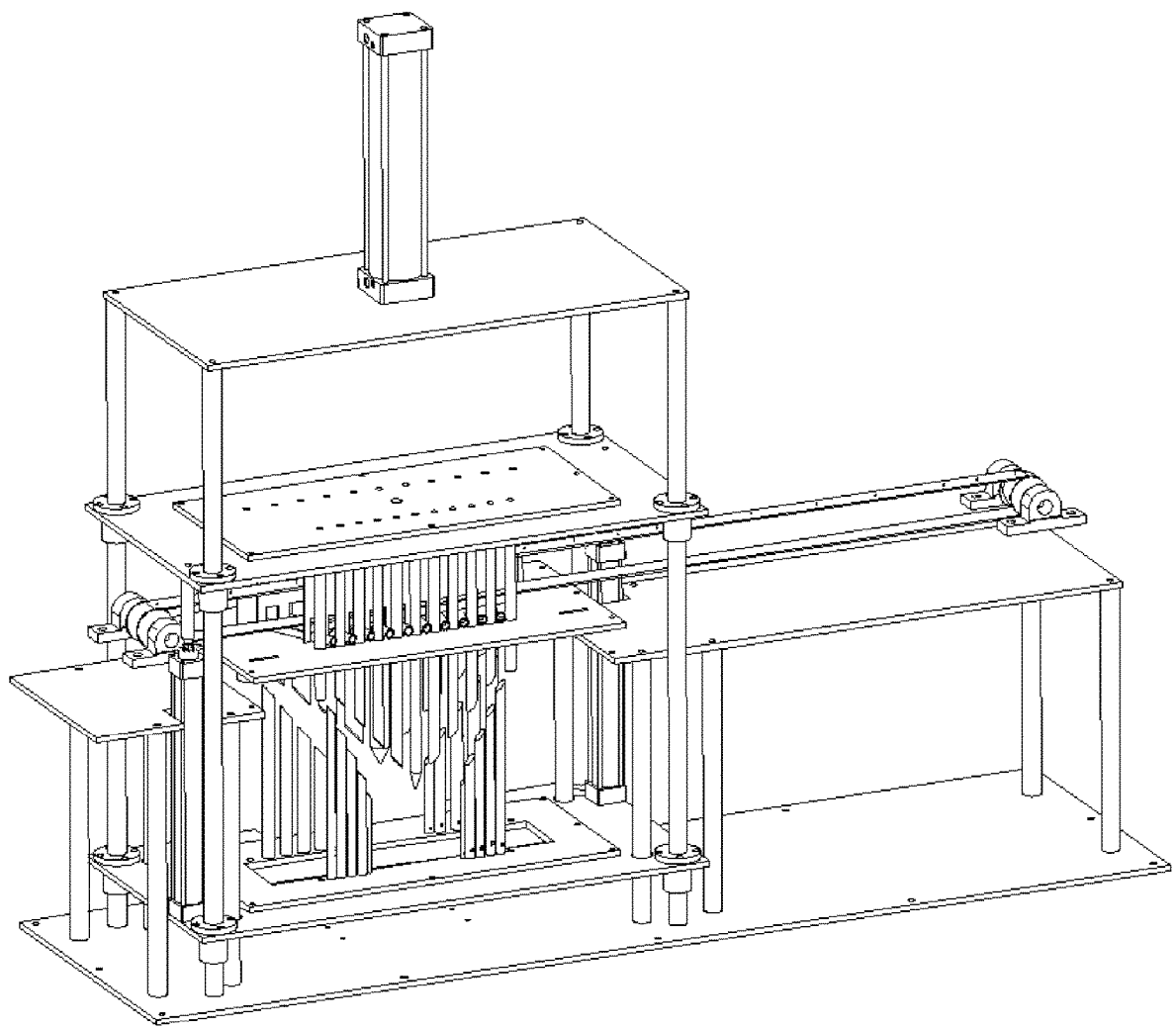
FIG. 13 is a schematic structural diagram of the fan-shaped body combination fireworks automatic production equipment according to Embodiment 1 of the present invention (the paper press is pressed down, and the bottom cardboard 102 is pressed into a folded state)
Figure 14:
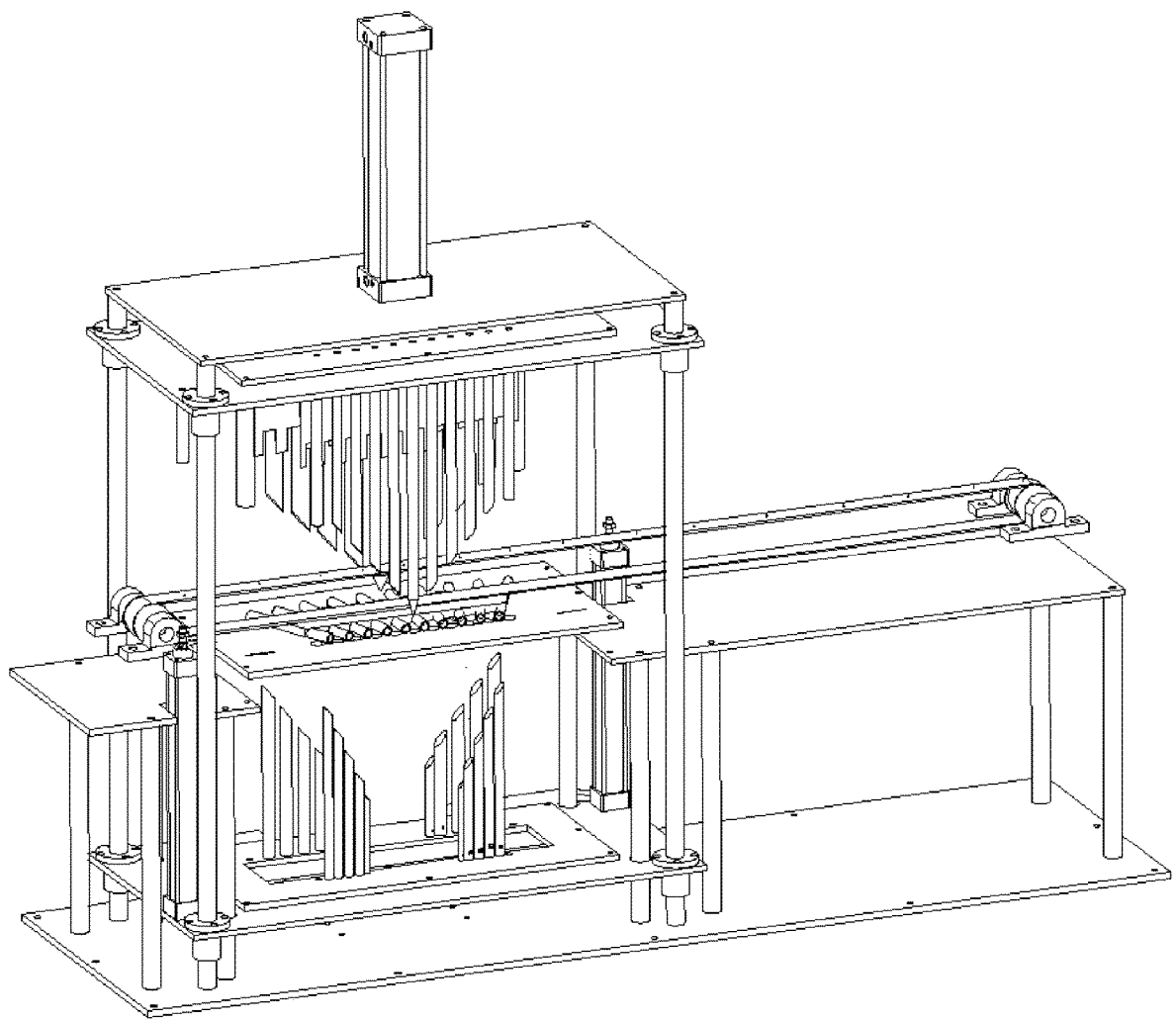
FIG. 14 is a schematic structural diagram of the fan-shaped body combination fireworks automatic production equipment according to Embodiment 1 of the present invention (the shaper and the paper press are raised and returned, the follow-up stopper is kept at the lower position of the stroke, and then raised and returned to the state shown in FIG. 4 after the upper tube row is withdrawn)
Figure 15:
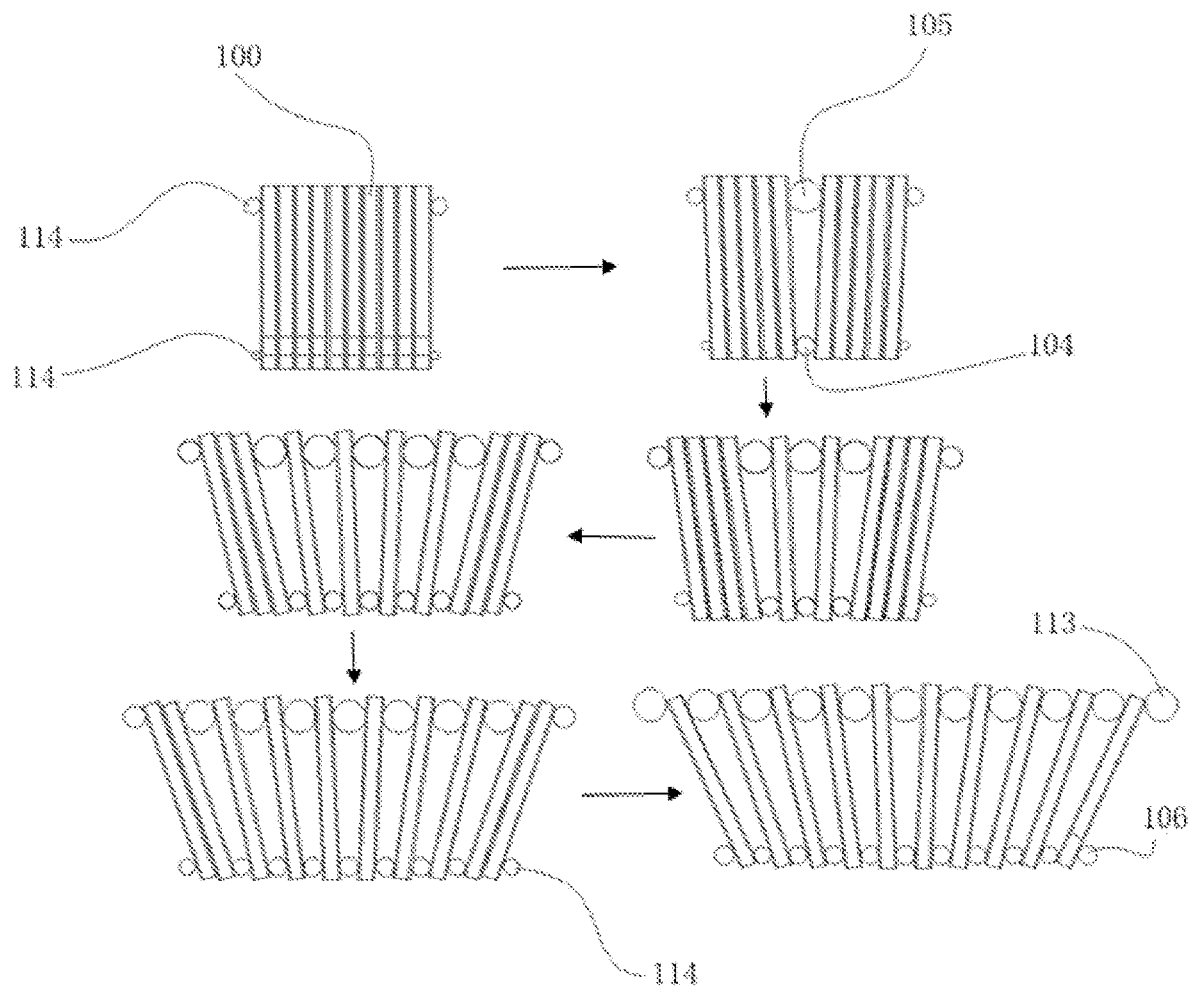
FIG. 15 is a schematic diagram of the modeling process of Embodiment 1 (bottom view of the paper tube group 100)

The working flow of the device is as follows:

The paper feeding mechanism conveys the stamped bottom cardboard 102 to the position corresponding to the paper tube group 100, and the notch positioning hole 103 is arranged corresponding to the paper tube 1;

As shown in FIG. 15, the two shapers move towards the paper tube group 100. From the middle to both sides, each insert is successively inserted between the two paper tubes 1 according to the position height of the tip 107. Since the tip position of the center insert is the lowest, the center insert is first inserted into the center inter-tube gap (i.e., the gap between the two paper tube bodies) of the paper cylinder group 100 to separate the paper tubes 1 on both sides to both sides. Subsequently, the two inserts close to the center inserts are respectively inserted into the two inter-tube gaps of the paper tube group 100 close to the inter-tube gap of the center, and the two outer paper tubes 1 are continuously separated to both sides; then other inserts are also inserted into the gaps between the tubes in sequence, and the paper tubes of the paper tube group 100 are arranged and formed according to the set tube spacing (the tube spacing is determined by the radial size of the inserts);

As shown in FIGS. 8, 9 and 10, that two presses 108 move towards the paper tube group 100, and each press tooth 110 respectively presses the cardboard 111 beside the hole to be stuck between the two paper tubes 1 in a folded state, so that both ends of each paper tube 1 are respectively embedded in the corresponding notch positioning holes 103 on both sides of the bottom cardboard 102, thus obtaining spaced tube rows with accurate positioning and relatively stable structure. The produced tube rows are all provided with a bottom cardboard 102, the two sides of the bottom cardboard 102 are correspondingly provided with notch positioning holes 103, and the bottom cardboard beside the notch positioning holes 103 forms a protruding hole side cardboard 111; the cardboard 111 beside the hole is stuck on both sides of the paper tube 1 in a folded shape. Then, according to the general process, the five-layer tube row is laminated and the pot is formed.

As shown in FIG. 15, when the following stopper is lowered according to the lowering action of the molding member, the molding member is lowered, and the width of the paper tube group 100 is increased due to the insertion of the insert member between the paper tubes; the follow-up stopper is also lowered, and the limiting work is replaced by the limiting working surface 115 of the higher adjacent outer limit rod 114. At this time, the spacing between the two limiting working surfaces 115 is correspondingly expanded. By analogy, the function of follow-up limit is realized.

When the top-level limit rod 114 is also lowered out of the positions on both sides of the paper tube group 100, the stop work is replaced by the casing members (first casing lever 106 and second casing lever 113) on both sides of the shaper, and the casing members continue to touch and press on both sides of the paper tube group 100 to avoid disturbance of the paper tubes 1 on both sides. Until the paper pressing member 108 presses the cardboard 111 beside the hole into a folded state and then rises and resets.

Embodiment 2

Figure 16:
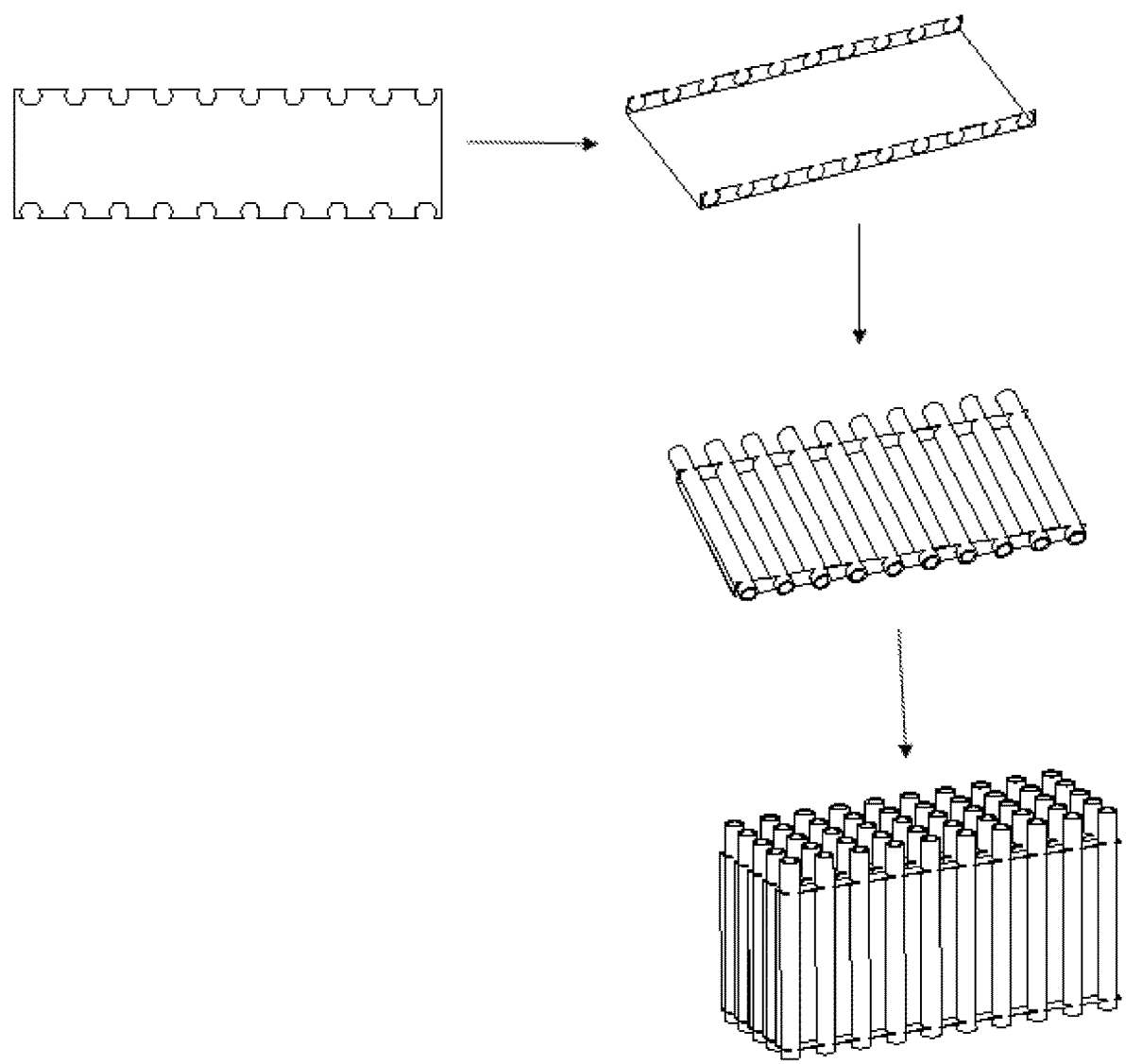
FIG. 16 is a schematic diagram of the production flow of the rectangular body combination fireworks formed by spaced tube rows in Embodiment 2.

Referring to FIG. 16, it is different from Embodiment 1 in that the processed rectangular combination fireworks are composed of spaced tube rows, and the tube rows do not need to from a fan shape, but a rectangular shape. Only the radial dimensions of the inserts of the two molded bodies are the same.

Embodiment 3

Figure 17:
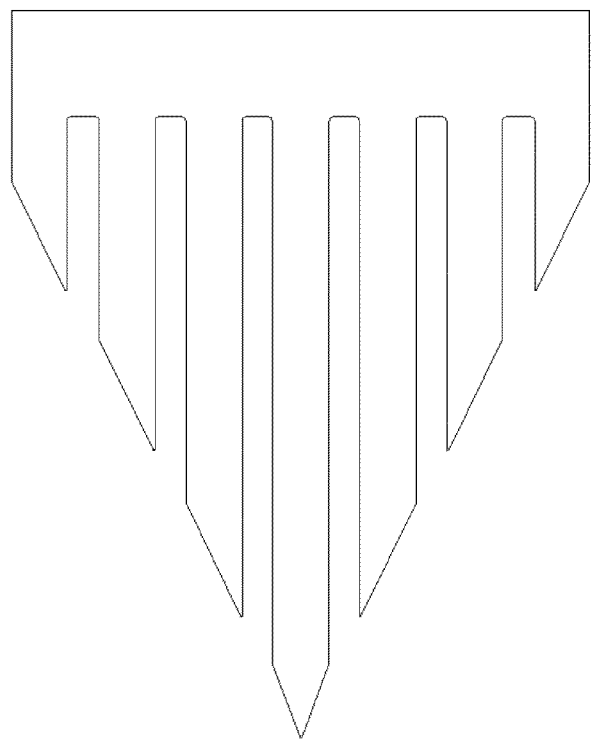
FIG. 17 is a schematic structural view of the shaper according to Embodiment 3.

Referring to FIG. 17, it is different from Embodiment 1 in that insert of the mold in this embodiment is a plate body instead of a rod body.

Embodiment 4

Figure 18:
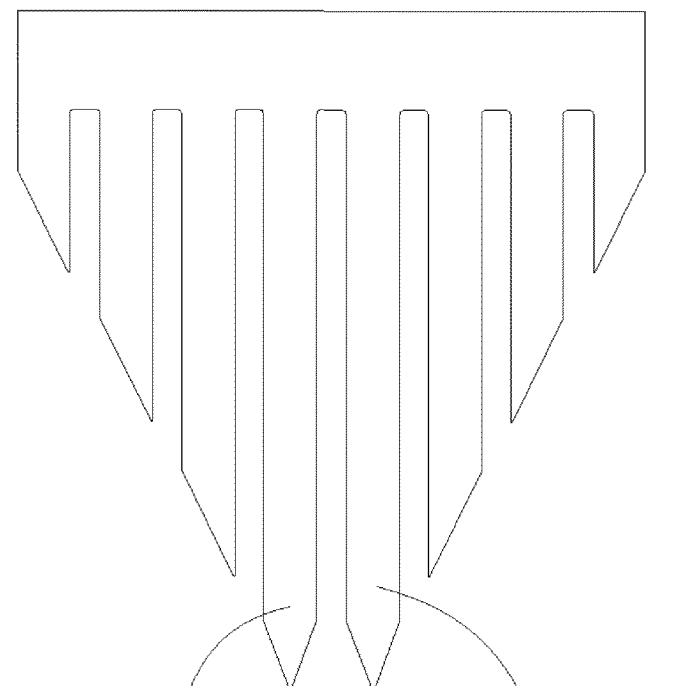
FIG. 18 is a schematic structural view of the shaper according to Embodiment 4.

Referring to FIG. 18, it is different from Embodiment 1 in that mold in this embodiment is a plate body instead of a rod body. The number of inserts of the shaper is eight (even numbers), and the number of paper tubes corresponding to the processed paper tube group is seven. The tips of the two centered inserts 201 and 202 are located at the lowest and equal height, and the centerline of the shaper is the centerline of the spacing between the two centered inserts 201 and 202.

Embodiment 5

Figure 19:
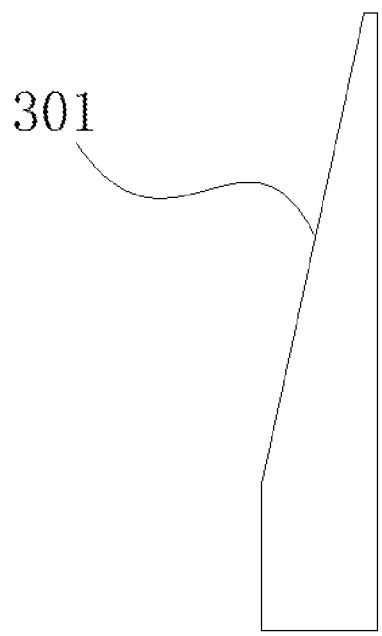
FIG. 19 is a schematic structural diagram of the follow-up stopper according to Embodiment 5.

Referring to FIG. 19, it is different from Embodiment 1 in that the follow-up stopper in this embodiment is a liftable plate body having a slope side 301, which constitutes the limit working surface.

Embodiment 6

Figure 20:
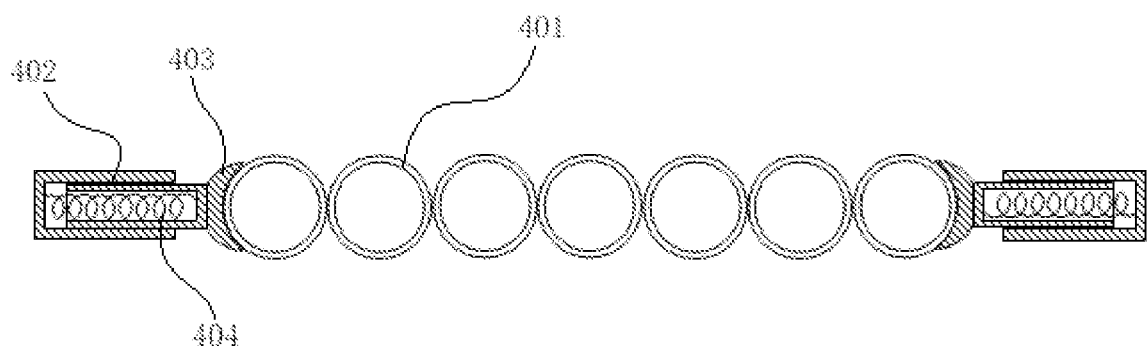
FIG. 20 is a schematic structural diagram of the follow-up stopper of Embodiment 6.

Referring to FIG. 20, it is different from Embodiment 1 in that in the embodiment, the follow-up stoppers on both sides of the paper tube group 401 are stoppers 404 fixedly attached to the sliding sleeve 402, and the sliding sleeve 402 is provided with springs 404. The spring 404 drives the stopper 404 to reciprocate horizontally and linearly so that the stopper function can be maintained while adapting to the width change of the paper tube group 401. A cylinder, a motor, or the like may be used to drive the stopper 404 to reciprocate horizontally and linearly.

Embodiment 7

Figure 21:
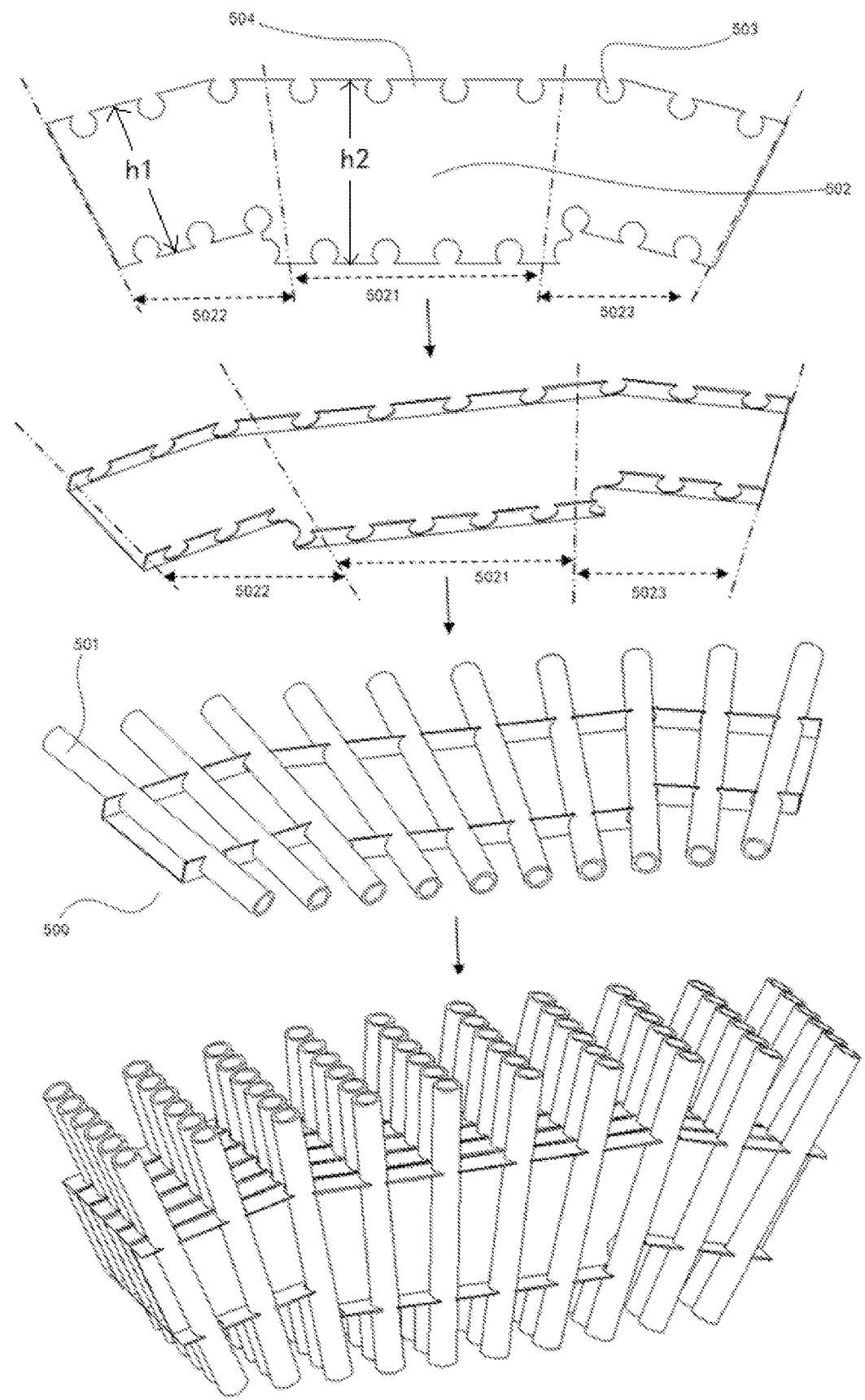
FIG. 21 is a schematic diagram of the production process of the fan-shaped combination fireworks composed of spaced tube rows according to Embodiment 7. The bottom paperboard consists of a central straight section and the oblique sections at both sides.
Figure 22:
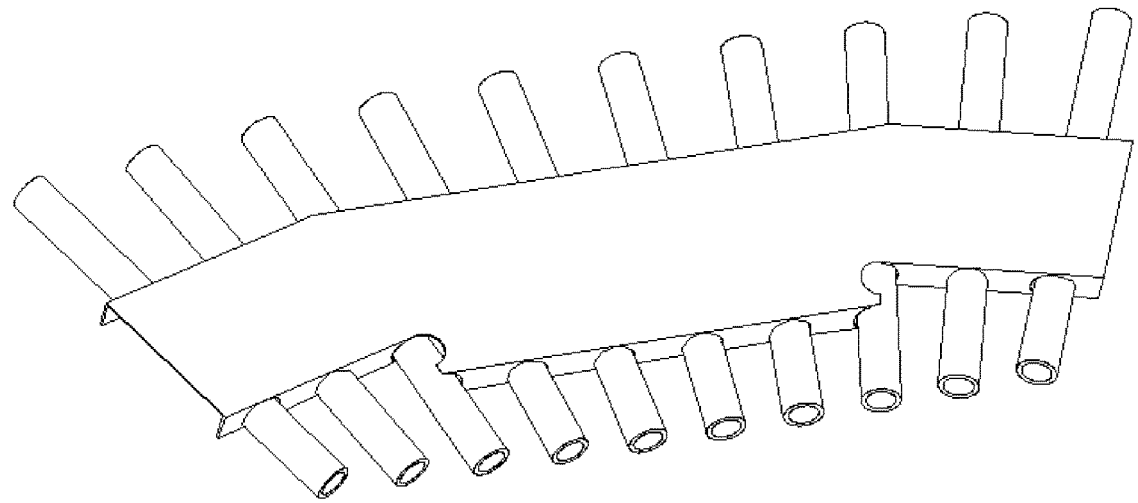
FIG. 22 is a schematic structural diagram of the back surface of the tube row according to Embodiment 7.
Figure 23:
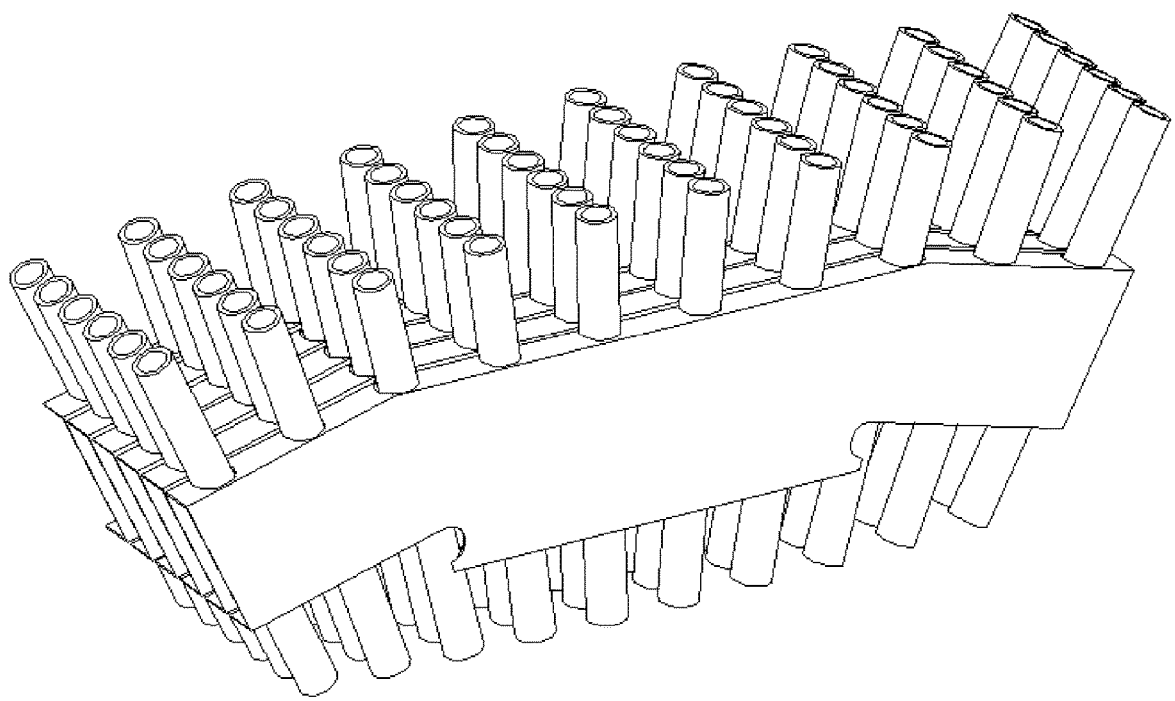
FIG. 23 is a schematic diagram of the back surface of the fan-shaped body combination fireworks according to Embodiment 7.

Referring to FIGS. 21-23, it is also the fan-shaped combination fireworks composed of spaced tube rows: ten paper tubes 501 form a tube row 500, and six tube rows 500 are laminated and assembled.

Each tube row 502 is provided with a bottom paperboard 502, both sides of the bottom paperboard are correspondingly provided with notch positioning holes 503, and the bottom paperboard beside the notch positioning holes 503 forms a protruding hole side paperboard 504; both ends of the paper tube 501 are respectively embedded in the corresponding notch positioning holes 503, and the paperboard 504 beside the holes is folded and stuck on both sides of the paper tube 501.

Different from Embodiment 1, in this embodiment, in order to make the distribution of the notch positioning holes 503 more consistent with the fan-shaped distribution position of the tube 501, thus effectively improving the positioning structural strength, the bottom paperboard 502 consists of the central straight section 5021, left oblique section 5022 and right oblique section 5023.

Make the distribution of the corresponding notch positioning holes 503 on both sides of the bottom paperboard more consistent with the fan-shaped distribution of the tube, so that both ends of the tube 503 are just stuck in the two corresponding notch positioning holes 503, which will not form a destructive twisting effect on the paperboard 504 beside the holes, thus effectively improving the positioning and the overall structural strength of the tube row.

The production method and equipment in this embodiment are similar to those in Embodiment 1, except that the punching positions of the notch positioning holes 503 punched by the punching mechanism on both sides of the bottom paperboard 502 shall be adjusted according to actual needs.

In this embodiment, in the bottom paperboard 502, the height of the central straight section 5021 is h2, and the height of the left oblique section 5022 and the right oblique section 5023 is h1, with h2 greater than h1. This reduces the punching difficulty so as to facilitate production processing, while minimizing punching waste, and maximizing the use of paperboard raw materials to obtain the bottom paperboard with higher structural strength.

Figure 24:
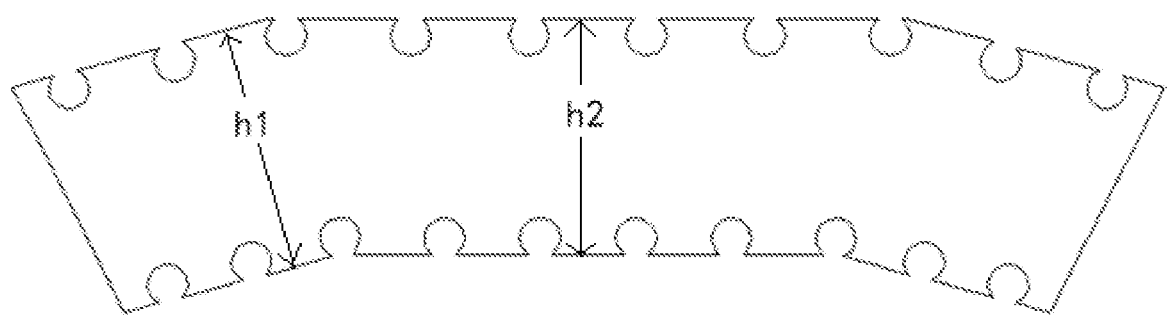
FIG. 24 is a schematic structural diagram of another embodiment, with the central straight section having the same height as the left oblique section and the right oblique section.

In other embodiments, h1 may also be equal to h2, as shown in FIG. 24.

The above implementation is only for the purpose of clearly illustrating the technical schemes of the invention and cannot be understood as limiting the invention in any way. The present invention has a variety of alternatives or variations known in the art and fall within the scope of protection of the present invention without departing from the essential meaning of the present invention.

The invention claimed is:

1. An arrangement for fireworks in which a plurality of paper tubes form a tube row and there are a plurality of tube rows each comprised of a plurality of respective paper tubes, the arrangement comprising:
    each tube row is provided with a bottom cardboard, two sides of the bottom cardboard are correspondingly provided with notch positioning holes, and the bottom cardboard beside the notch positioning holes, on both sides of the bottom cardboard, forms a protruding cardboard portion beside the notch positioning holes; and
    both end portions of the paper tubes are respectively embedded in corresponding notch positioning holes on the two sides of the bottom cardboard, and cardboard beside the notch positioning holes is folded and engages with respective exterior surfaces of the paper tubes.

2. The arrangement for fireworks of claim 1, wherein the notch positioning holes are semi-circular.

3. The arrangement for fireworks of claim 2, wherein a notch length of the notched semi-circular holes is not greater than a diameter of the paper tubes.

4. The arrangement for fireworks of claim 3, wherein a hole spacing of the corresponding notch positioning holes on both sides of the bottom cardboard is the same.

5. The arrangement for fireworks of claim 3, wherein a hole spacing of the corresponding notch positioning holes on both sides of the bottom cardboard is different, and the hole spacing of the notch positioning holes near a top end of the paper tubes is larger than a bottom end of the paper tubes.

6. The combination fireworks according to claim 5, wherein the bottom cardboard consists of a central straight section and oblique sections at both sides.

7. The arrangement for fireworks of claim 2, wherein a hole spacing of the corresponding notch positioning holes on both sides of the bottom cardboard is the same.

8. The arrangement for fireworks of claim 2, wherein a hole spacing of the corresponding notch positioning holes on both sides of the bottom cardboard is different, and the hole spacing of the notch positioning holes near a top end of the paper tubes is larger than a bottom end of the paper tubes.

9. The arrangement for fireworks of claim 1, wherein a hole spacing of the corresponding notch positioning holes on both sides of the bottom cardboard is the same.

10. The arrangement for fireworks of claim 1, wherein a hole spacing of the corresponding notch positioning holes on both sides of the bottom cardboard is different, and the hole spacing of the notch positioning holes near a top end of the paper tubes is larger than a bottom end of the paper tubes.

\* \* \* \* \*